May 7, 1946. C. L. CONROY 2,399,790
METHOD OF PERMANENTLY ATTACHING HOSE COUPLINGS
Filed May 27, 1943   2 Sheets-Sheet 1
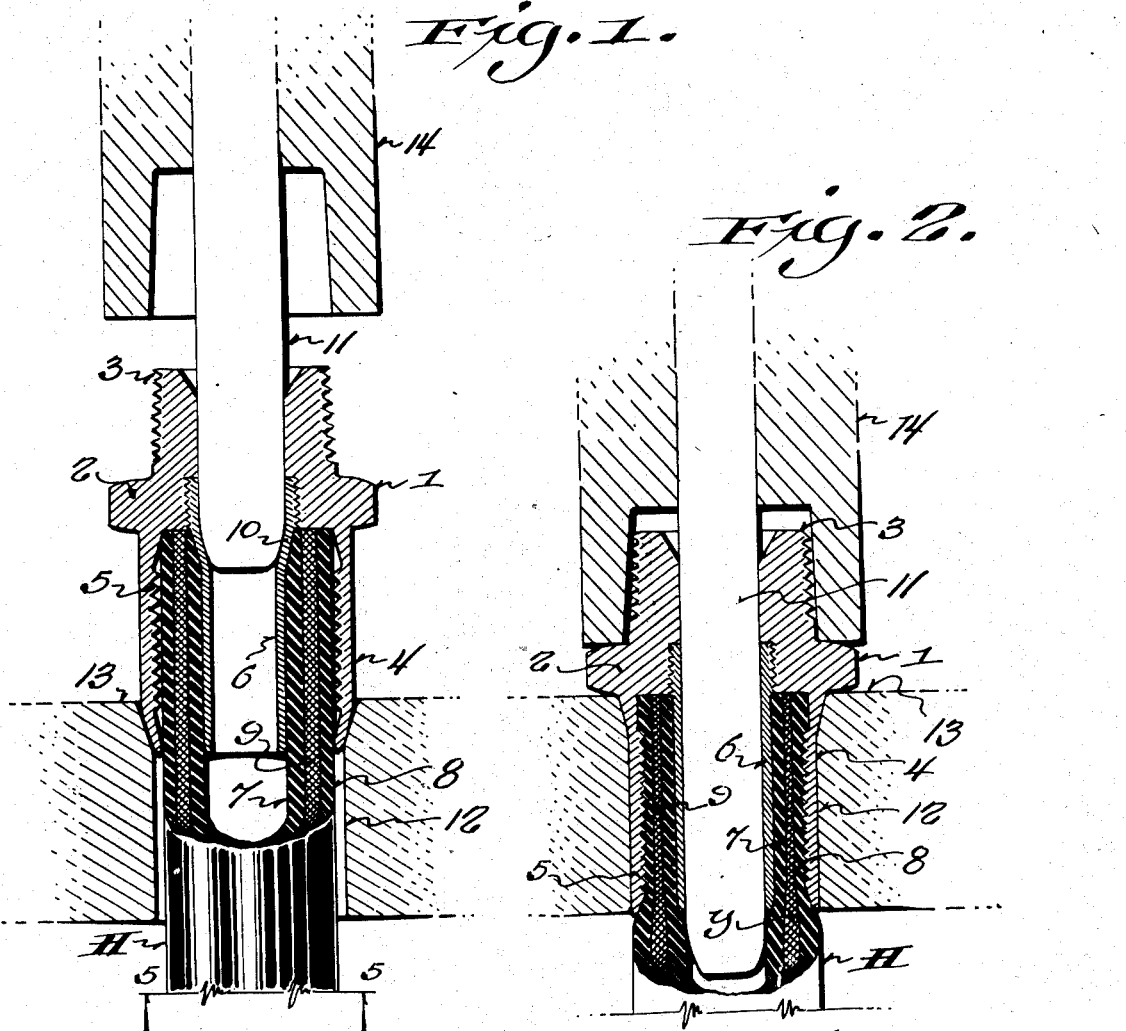
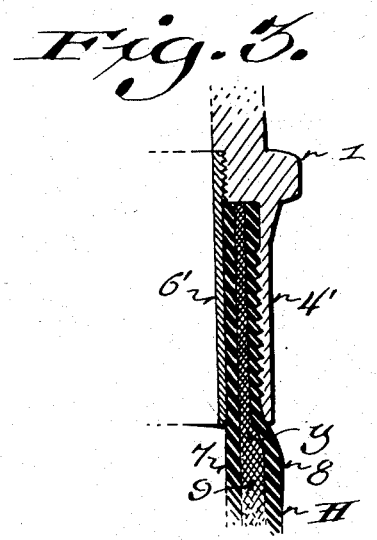
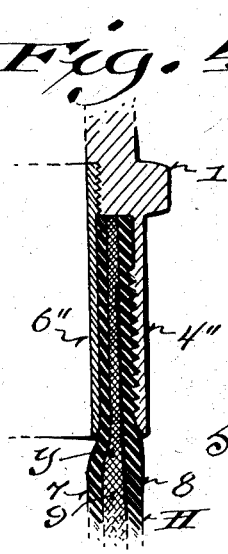
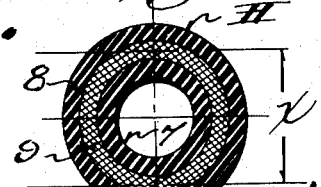
Inventor
Charles L. Conroy
By
Attorney

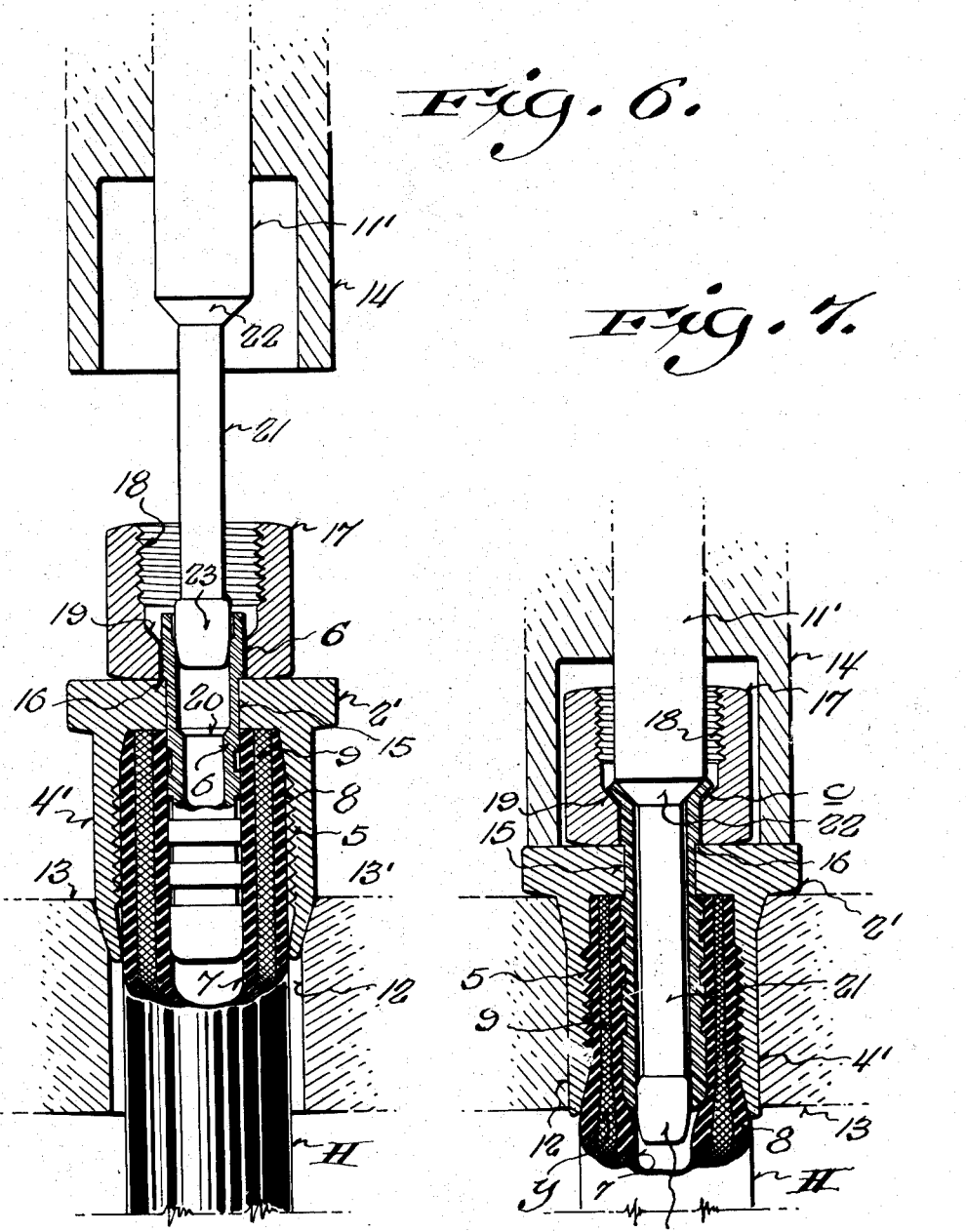

Patented May 7, 1946

2,399,790

UNITED STATES PATENT OFFICE 2,399,790

METHOD OF PERMANENTLY ATTACHING HOSE COUPLINGS

Charles L. Conroy, Libertyville, Ill., assignor of one-half to Walter Fritsch, Libertyville, Ill.

Application May 27, 1943, Serial No. 488,667

4 Claims. (Cl. 29—148.2)

This invention relates to a method of permanently attaching a coupling to the end of a flexible non-metallic reinforced hose.

High or medium pressure hose is usually reinforced with either metallic or fabric braid, depending upon the particular use to which it is to be put, and at the present time two methods are commonly employed for attaching couplings provided with inserts, and outer shells between which the house is compressed and clamped.

By one method the shell is contracted or pressed upon the outer surface of the hose, while in the other the insert is expanded. Both of these methods result in disturbing the normal mean diameter of the hose and reinforcement to the extent that distortion or crimping of the braid occurs at the end of the coupling, as a result of which a weak point is created that causes premature fatigue and failure of the hose at that point because of flexing of the hose and fluid pressure pulsations.

To overcome the objection encountered, auxiliary protectors have been provided to limit flexing of hoses adjacent the ends of the couplings such as shown in United States Letters Patents Nos. 1,044,013 and 1,971,500. Guards of the foregoing type require an extra element, which increases the cost of the coupling in both manufacture and assembly.

The present invention has primarily for its object to overcome all of the foregoing objections by the provision of a novel method of permanently attaching a coupling to the end of a reinforced hose consisting, in both expanding the coupling insert and contracting the outer shell in substantially equal proportions to compress the end of the hose without disturbing its normal mean diameter.

By way of definition the term "mean diameter" is intended to define the central diameter of the hose between its inner and outer surfaces.

In addition to the foregoing, a more specific object of the invention when employed in the assembling and attaching of a coupling provided with a swivel connecting member, resides in permanently assembling the connecting member on the coupling shell in conjunction with the expansion of the insert and contraction of the coupling shell, in a single operation.

With the above and other objects in view, which will appear as the description proceeds, the invention resides in the novel method, substantially as hereinafter described, and more particularly defined by the appended claims, it being understood that such changes in the precise embodiment of the herein disclosed invention may be made as come within the scope of the claims.

In the accompanying drawings are illustrated forms of couplings employed in preforming the present method according to the best mode so far devised for the practical applications of the principles thereof.

In the drawings:

Fig. 1 is a sectional view illustrating a coupling positioned upon the end of a reinforced flexible hose prior to permanent attachment of the coupling.

Fig. 2 is a similar view illustrating complete attachment of the coupling and one form of apparatus that may be employed.

Figs. 3 and 4 are fragmentary vertical sectional views through couplings showing results accomplished by previous methods of attachment.

Fig. 5 is a transverse section of the reinforced hose taken out of line 5—5 of Fig. 1; and Figs. 6 and 7 illustrate one form of apparatus employed in the assembling and attachment of a coupling provided with a swivel connecting member as shown.

Referring now more particularly to Figs. 1 and 2 of the accompanying drawings, the numeral 1 designates a conventional type of coupling consisting of a head 2 provided with an externally threaded end 3 for attachment to a fitting or other piece of apparatus (not shown). Depending from the head 2 is an outer shell 4, usually provided with internal annular gripping threads or projections 5.

Threaded into the head 2 is a stem or insert 6, spaced from the outer shell 4 to allow an end of the hose H to be inserted into the coupling, as best shown in Fig. 1. However, it is to be understood that the insert may be an integral part of the coupling shell without affecting the main principle of the invention.

The hose H is of conventional structure formed of rubber or other flexible non-metallic material and consisting of inner and outer layers 7 and 8, respectively, between which a layer of either fabric or metallic braid 9 is encased.

In carrying out the present method the insert 6 is provided at its upper end with a taper 10, and is designed to fit snugly within the interior of the hose, which is inserted into the coupling between the stem 6 and outer shell 4, as shown in Fig. 1.

To permanently attach the coupling 1 to the end of the reinforced hose H, the invention contemplates the use of an expanding pin 11, which is inserted through the head 2 and forced downwardly by a press or other machine (not shown).

During initial projection of the expanding pin 11 into the insert 6, its diameter is much as to slightly expand the upper threaded end of the insert forcing its threads into those of the head to effect a secure pressure seal. Then as the pin 11 continues downwardly into the restricted portion of the insert the same is expanded to a uniform internal diameter throughout.

During the initial operation of the expanding pin sufficient friction or resistance is created to cause the coupling shell 4 to be forced into the split die 13 until such time as the friction or resistance created by the die overcomes that on the pin. The expanding pin then completes its downward stroke through the insert until such time as the ramcap 14 engages the coupling head 2 forcing the same into the split die 13 to complete contraction of the shell.

On the upper or return stroke of the pin 11 the bind or friction created between the split die and shell, being greater than the bind between the friction pin and insert, causes the shell to be held within the die until the pin is withdrawn, after which the coupling is released by opening the die.

The diameters of the expanding pin 11 and opening 12 in the die 13 are so proportioned as to create expansion of the insert 6 and contraction of the shell 4, substantially equal distances to avoid displacement of the normal mean diameter of the hose, which is the central diameter between the outer and inner surfaces of the hose indicated as $x$ in Fig. 5, and also the central diameter of the reinforcement 9.

When the foregoing is accomplished, it will be noted, as shown in Fig. 2, that the wall of the hose H, as well as the reinforcement 9 has been compressed without displacement of the normal mean diameter of the hose, thus avoiding distortion or crimping of the reinforcement at the point $y$ just below the end of the coupling.

Figs. 3 and 4 illustrate results accomplished by conventional methods of attachment, and are shown only for the purpose of comparison.

In Fig. 3 the insert 6' retains its normal diameter, while the outer shell 4' of the coupling is contracted or compressed upon the hose, with the result that the reinforcement 9 is offset and crimped at the point $y$, which results in a distortion of the braid at that point to cause a weak spot at which premature fatigue and failure occur because of the flexing of the hose and pressure pulsations.

Fig. 4 illustrates that form of coupling in which the insert 6'' has been expanded while the outer shell 4'' retains its normal diameter. In this instance the mean diameter of the compressed portion of the hose is displaced outwardly with relation to the normal mean diameter of the hose, which produces the same results and objections as set forth in connection with the method illustrated in Fig. 3.

In connection with the type of coupling shown in Figs. 6 and 7 the method so far described is carried a step further to include the permanent attachment of a swivel connecting member to the head of the coupling shell during the single operative stroke of the tool that causes expansion of the insert and contraction of the shell.

Referring to Fig. 6 of the drawings the coupling shown consists of an outer shell 4' provided with a head 2' extending beyond the perifery of the shell. In the present instance the tubular insert 6' is positioned in a central opening 15 formed in the head 2' and is supported by an external flange 16 located below its upper end so that the same extends above the head 2'.

Positioned upon the extending upper end of the insert is a swivel nut or connecting member 17, having an enlarged internally threaded bore 18 in its upper end, the lower end of the bore terminating in a tapered shoulder 19, and a restricted opening for reception of the insert.

It will be noted that the upper end of the insert 6' extends a short distance above the shoulder 19, and that the inner diameter of the lower portion of the insert is restricted to form a shoulder 20 in substantial alignment with the lower face of the head 2'.

In the present instance the expanding pin 11' is provided at its lower end with a restricted shank 21, while a tapered shoulder 22 is formed between the lower end of the pin and the shank. The lower end of the shank terminates in a slightly enlarged head 23, the diameter of which determines the extent of expansion of the insert.

In practicing the present method, expansion of the insert 6' and contraction of the outer shell 4' are obtained in accordance with the operation previously described. However in order to permanently attach the swivel connecting member 17 to the head 2' during the operative stroke of the expanding pin, the tapered shoulder 22 formed on the pin engages the upper end of the insert just prior to completion of the stroke, causing the upper end of the insert to be flared outwardly in the manner shown in Fig. 7.

It will be particularly noted that the lower end of the ram cap is so located with reference to the tapered shoulder 22 as to provide a slight clearance $c$ between the flared end of the insert and the tapered shoulder 19, thus serving to permanently retain the connecting member 17 on the head 2', and at the same time permit its free rotation.

Here, attention is directed to the fact that through expansion of the upper end of the insert, the same is tightly sealed and locked in the head 2', while expansion of the lower or restricted portion of the insert which commences when the expanding head 23 engages the shoulder 20, causes immediate expansion of the outer wall of the insert below the face of the head 2 to rivet or lock the insert to the head.

In view of the foregoing explanation considered in connection with the accompanying drawings, it will be apparent that an exceedingly simple and effective method has been devised for the attachment of a conventional type of coupling to the end of a reinforced hose, which avoids displacement of the normal mean diameter of the hose, and consequent distortion or weakening of the reinforcing braid at the end of the coupling to cause fatigue and premature failure of the hose at that point, as occurs in couplings attached by the old methods now in use.

Also, by the present method of attachment it is possible to permanently assemble a coupling including a swivel connecting member during the attaching operation.

Obviously various forms of equipment may be employed in the practice of the present method defined by the following claims.

I claim:

1. The method of permanently attaching a coupling comprising an insert and an outer shell to the end of a flexible non-metallic hose having imbedded metallic reinforcement consisting in, successively expanding the insert radially and then radially contracting the outer shell during one stroke of a tool to equally compress the wall of the hose between the insert and contracted shell to permanently secure the shell to the hose and substantially maintain its normal mean diameter.

2. The method of assembling and permanently attaching a coupling of the type including an outer shell provided with an insert and a connecting member rotatably attached to the head of the shell to the end of a reinforced flexible non-metallic hose consisting in, successively expanding the insert radially, attaching the rotatable connecting member to the head of the shell, and then radially contracting the outer shell to compress the wall of the hose between the insert and contracted shell to permanently secure the shell to the hose and substantially maintain its normal mean diameter, all during one stroke of a tool.

3. The method of permanently attaching a coupling comprising an insert and outer shell to the end of a flexible non-metallic hose consisting in, first gradually expanding the insert radially starting from the head of the shell and proceeding downwardly to the lower end thereof to permanently secure the shell to the hose, and then gradually contracting the shell radially starting from its lower end and proceeding toward the head.

4. The method of permanently attaching a coupling comprising an insert and an outer shell to the end of a flexible non-metallic hose consisting in, first contracting the lower end of the shell sufficiently to lock it on the hose, then gradually expanding the insert radially starting from the head of the shell and proceeding downwardly to the lower end thereof, and then gradually contracting the shell radially starting from its lower end and proceeding toward its head to equally compress the wall of the hose between the insert and contracted shell and substantially maintain its normal mean diameter.

CHARLES L. CONROY.